US009379905B2

(12) United States Patent
Juneja et al.

(10) Patent No.: US 9,379,905 B2
(45) Date of Patent: Jun. 28, 2016

(54) SUPPORTING A WIRELESS NETWORK PROTOCOL ON A MOBILE DEVICE USING A WIRED INTERFACE

(75) Inventors: Anupam Juneja, San Diego, CA (US); Hrishikesh A Dandekar, San Marcos, CA (US)

(73) Assignee: Kyocera Corporation, Kyoto (JP)

( * ) Notice: Subject to any disclaimer, the term of this patent is extended or adjusted under 35 U.S.C. 154(b) by 1382 days.

(21) Appl. No.: 12/913,995

(22) Filed: Oct. 28, 2010

(65) Prior Publication Data

US 2012/0106441 A1    May 3, 2012

(51) Int. Cl.
| | |
|---|---|
| *H04W 4/00* | (2009.01) |
| *H04L 12/46* | (2006.01) |
| *H04L 29/06* | (2006.01) |
| *H04W 88/06* | (2009.01) |

(52) U.S. Cl.
CPC ............ *H04L 12/4625* (2013.01); *H04L 69/08* (2013.01); *H04L 69/14* (2013.01); *H04L 69/18* (2013.01); *H04W 88/06* (2013.01)

(58) Field of Classification Search
CPC ..... H04L 12/4625; H04L 69/14; H04L 69/08; H04L 69/18; H04W 88/06
USPC ......................................................... 370/466
See application file for complete search history.

(56) References Cited

U.S. PATENT DOCUMENTS

| | | | |
|---|---|---|---|
| 6,633,921 B1* | 10/2003 | Pan ................................ 709/250 |
| 6,697,892 B1* | 2/2004 | Laity et al. ...................... 710/72 |
| 6,934,788 B2* | 8/2005 | Laity et al. ..................... 710/303 |
| 7,707,348 B2* | 4/2010 | Huotari et al. ................ 710/313 |
| 7,961,746 B2* | 6/2011 | Jan et al. ........................ 370/419 |
| 8,326,289 B2* | 12/2012 | Gunder .......................... 455/433 |
| 2003/0135681 A1* | 7/2003 | Laity et al. ..................... 710/303 |
| 2005/0025161 A1 | 2/2005 | Spooner |
| 2005/0216639 A1 | 9/2005 | Sparer |
| 2006/0135138 A1 | 6/2006 | Lazaridis |
| 2007/0016714 A1* | 1/2007 | Huotari et al. ................ 710/313 |
| 2007/0155422 A1 | 7/2007 | Johansen |
| 2008/0065805 A1* | 3/2008 | Wu et al. ....................... 710/301 |
| 2008/0117860 A1 | 5/2008 | Rodriguez et al. |
| 2008/0139195 A1 | 6/2008 | Marsyla et al. |
| 2009/0070861 A1* | 3/2009 | Jain ................................. 726/5 |
| 2009/0175283 A1* | 7/2009 | Jan et al. ........................ 370/401 |
| 2010/0011128 A1* | 1/2010 | Paycher et al. ................... 710/1 |
| 2010/0067595 A1* | 3/2010 | Feher ............................ 375/261 |
| 2010/0075678 A1 | 3/2010 | Akman et al. |
| 2010/0082488 A1* | 4/2010 | Evans et al. ..................... 705/59 |
| 2010/0291920 A1* | 11/2010 | Lerzer et al. ................ 455/426.1 |
| 2010/0325335 A1* | 12/2010 | Kim et al. ..................... 710/316 |
| 2011/0009711 A1* | 1/2011 | Nanikashvili et al. ........ 600/301 |

(Continued)

*Primary Examiner* — Jay P Patel (57) ABSTRACT

The disclosed mobile communication device, system and method permit the process of integration and/or testing of one or more new and/or evolving wireless technologies on a mobile device without complete hardware integration. To achieve this, the mobile communication device includes a wired interface configured to communicate with a separate device via a wired connection using a wired network protocol. The mobile device also includes a data plane bridge that translates data packets between the wired network protocol of the wired interface and a wireless network protocol. The wireless network protocol is used by a mobile application executing on the mobile communication device to transfer the data packets over a wireless link. The data plane bridge and wired interface permit the data packet to be transferred over the wired interface, instead of the wireless link.

20 Claims, 9 Drawing Sheets

(56) References Cited

U.S. PATENT DOCUMENTS

| | | | |
|---|---|---|---|
| 2011/0028218 A1* | 2/2011 | Gomes et al. | 463/39 |
| 2011/0127843 A1* | 6/2011 | Karaoguz | G06K 7/10207 |
| | | | 307/104 |
| 2011/0158216 A1* | 6/2011 | Zaks | 370/338 |
| 2012/0051272 A1* | 3/2012 | Jain et al. | 370/310 |
| 2012/0099428 A1* | 4/2012 | Kamdar et al. | 370/235 |
| 2012/0226759 A1* | 9/2012 | Lew et al. | 709/206 |
| 2012/0231766 A1* | 9/2012 | Jain et al. | 455/411 |
| 2014/0126425 A1* | 5/2014 | Burd | H04L 12/4633 |
| | | | 370/255 |

* cited by examiner

SUPPORTING A WIRELESS NETWORK PROTOCOL ON A MOBILE DEVICE USING A WIRED INTERFACE

TECHNICAL FIELD

The present invention generally relates to communication systems, and more particularly, to the integration and testing of new and/or evolving wireless communication technologies.

BACKGROUND

In the existing mobile devices, various wireless technologies like GSM, code division multiple access (CDMA), Evolution Data Optimized (EVDO), and Wi-Fi (WLAN) are supported by either having the corresponding chipset interface with the mobile device through a Universal Serial Bus (USB), a Secure Digital Input/Output (SDIO), or some other bus interface, or by simply having the wireless technology integrated on-chip within the mobile device itself.

This sometimes makes it difficult to use or even start the process of software/firmware integration and testing of new and evolving wireless technologies, such as the Long Term Evolution (LTE) standard, without first completing the hardware integration on the mobile device. With known mobile devices and wireless communication systems, for a complete, end-to-end solution with a newer wireless technology, it is required to have the wireless technology already integrated at a software/firmware level, as well as at a hardware level on the mobile devices.

SUMMARY

Undertaking software/firmware level development, integration and basic functionality testing is often limited by the lack of hardware-level integration of a wireless technology within a mobile device. As disclosed herein, this problem is addressed by providing a unique architecture of a mobile device, which permits the process of integrating and/or testing new and evolving wireless technologies on the mobile device without complete hardware integration, and in some instances, without complete software/firmware integration of the wireless technology.

According to an aspect, a mobile communication device (MCD) includes a wired interface configured to communicate with a separate device via a wired connection using a wired network protocol. The MCD also include a data plane bridge responsive to the wired interface and a mobile application running on the MCD. The data plane bridge is configured to translate data packets between the wired network protocol of the wired interface and a wireless network protocol. The wireless network protocol is used by the mobile application to transfer the data packets over the wireless link. The combination of the data plane bridge and the wired interface permit the data packets to be transferred over the wired connection, instead of a wireless link.

According to another aspect, a system includes a networked device having a Universal Serial Bus (USB) interface and an Ethernet interface, and an MCD. The MCD includes an application that transfers data packets using a wireless network protocol, a USB interface to communicate with the networked device via a wired USB connection, and a data plane bridge to translate the data packets between the USB protocol and a wireless network protocol.

According to another aspect, a method of communication between a MCD and a networked device includes: connecting the MCD to the networked device via a wired interface that uses a wired network protocol; executing an application on the MCD, wherein the application sends and receives data packets using a wireless network protocol; at the mobile communication device, translating the data packets between the wired network protocol and the wireless network protocol; and communicating the data packets between the MCD and the networked device via the wired interface using the wired network protocol.

Other aspects, features, advantages and variations of the method and user interface will be or will become apparent to one with skill in the art upon examination of the following figures and detailed description. It is intended that all such additional aspects, features, variations and advantages be included within this description and be protected by the accompanying claims.

BRIEF DESCRIPTION OF THE DRAWINGS

It is to be understood that the drawings are solely for purpose of illustration and do not define the limits of the appended claims. Furthermore, the components in the figures are not necessarily to scale. In the figures, like reference numerals designate corresponding parts throughout the different views.

DETAILED DESCRIPTION

The following detailed description, which references to and incorporates the drawings, describes and illustrates one or more specific embodiments of what is claimed. These embodiments, offered not to limit but only to exemplify and teach the invention, are shown and described in sufficient detail to enable those skilled in the art to practice the invention defined by the claims. Thus, where appropriate to avoid obscuring the invention, the description may omit certain information known to those of skill in the art.

The word "exemplary" is used throughout this disclosure to mean "serving as an example, instance, or illustration." Any embodiment or feature described herein as "exemplary" is not necessarily to be construed as preferred or advantageous over other embodiments or features.

For mobile application developers, it is often a challenge to test applications on a mobile communication device (MCD) without having the underlying wireless service enabled and available on the MCD. There could be a number of issues that would prevent the testing of a mobile application that requires Internet access on the MCD, some of which include:

1. The MCD does not have the wireless technology completely integrated.
2. The MCD has not passed the Safe Network Test (SFN) for the wireless technology.
3. The MCD has not been activated on a carrier network, or is in a poor coverage area.
4. There are no wireless network emulators yet available for the particular wireless technology.
5. The developer may not have access to all the development tools, emulators and services that the MCD original equipment manufacturer (OEM) has. Such third-party developers may need Internet access through the MCD to test out their mobile applications.

Figure 1:
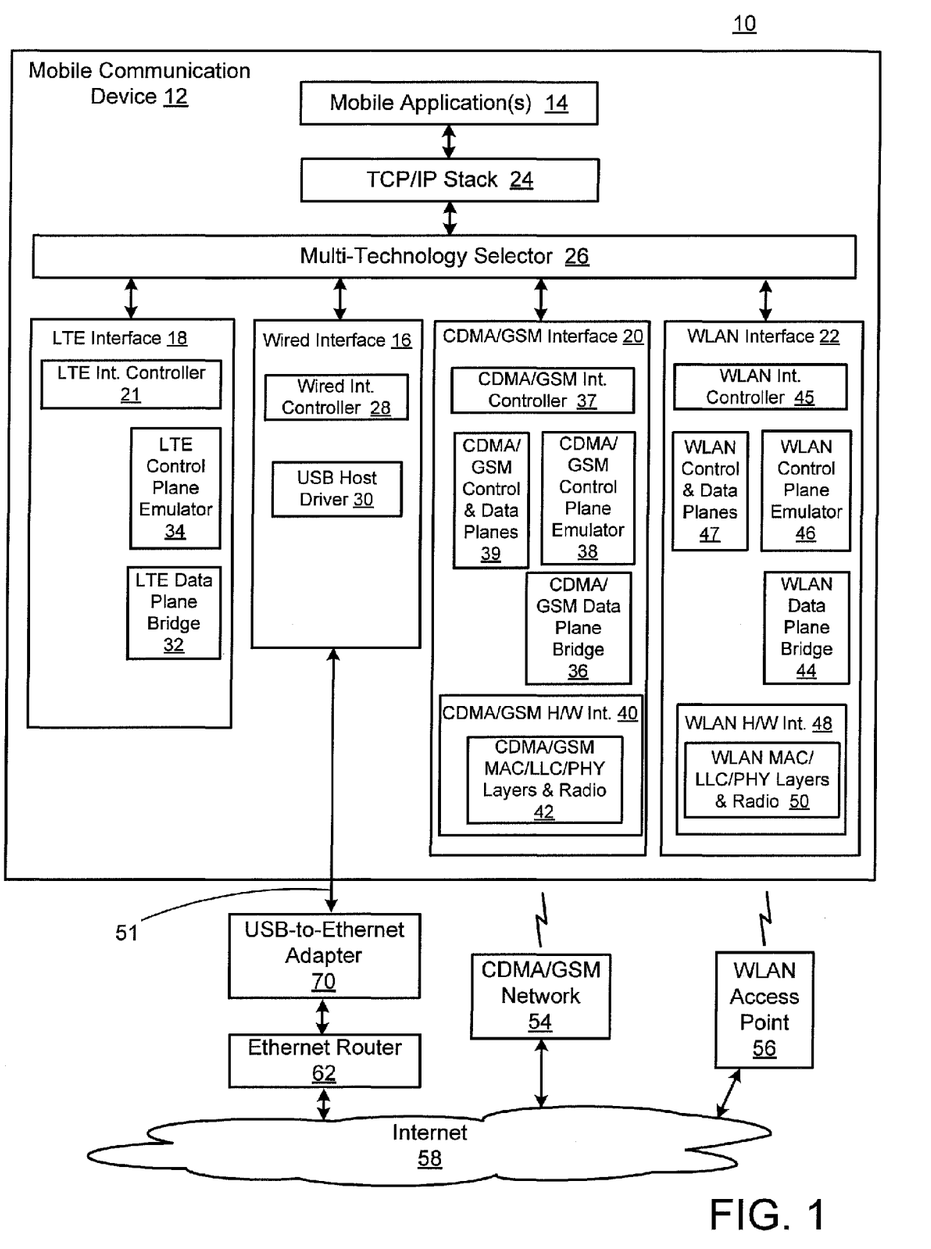
FIG. 1 illustrates a first exemplary wireless communication system including a mobile communication device (MCD) capable of supporting multiple wireless technologies, some having end-to-end support and others being emulated.

FIG. 1 illustrates a first exemplary wireless communication system 10 including a mobile communication device (MCD) 12 capable of emulating one or more wireless network protocols, i.e., wireless technologies. The system 10 is configured to permit the testing of mobile applications that require Internet access on the MCD 12, where the MCD 12 does not yet have the particular wireless technology completely integrated. For example, the MCD 12 may not include complete hardware and/or software/firmware for supporting certain wireless technologies. In the example shown, the MCD 12 does not include hardware for the Long Term Evolution (LTE) interface 18.

The system 10 includes the MCD 12, a networked device, e.g., a USB-to-Ethernet adapter 70, such as a dongle, an Ethernet router 62, one or more wireless networks 54-56, and the Internet 58. The MCD 12 can communicate with the wireless networks 54-56 by way of one or more wireless links. In the example shown, the wireless networks 54-56 include a wide-area wireless network (WWAN), such as CDMA/GSM network 54, and a wireless local area network (WLAN), such as a Wi-Fi network including a WLAN access point 56.

The USB-to-Ethernet adapter 70 and Ethernet router 62 may be commercially-available, off-the-shelf components that provide USB-to-Ethernet relay services.

The adapter 70 and MCD 12 communicate by way of wired network cable 51, such as a standard USB cable. In the example system 10, the wired network is a wired Universal Serial Bus (USB). Each of the Ethernet router 62, the CDMA/GSM network 54 and the WLAN access point 56 can allow the MCD 12 to communication with the Internet 58.

The MCD 12 (and MCD 13 shown in FIG. 2) may be any suitable type of terminal device, such as a mobile cellular phone, personal digital assistant (PDA), cordless phone, laptop computer, gaming device, or the like. The MCD 12 includes one or more mobile applications 14, a TCP/IP stack 24, a multi-technology selector 26, a wired interface 16, and one or more wireless network interfaces 18, 20, 22. In the example shown, the wireless network interfaces 18, 20, 22 are a Long Term Evolution (LTE) interface 18, a code division multiple access (CDMA) interface 20, and a WLAN interface 22, such as a Wi-Fi interface. Although three specific wireless interfaces 18, 20, 22 are shown in FIG. 1, different numbers, types and combinations of wireless interfaces could be included in the MCD 12, as well as the MCD 13 shown in FIG. 2.

The system 10 offers a wireless telecommunications technology agnostic interface on the MCD 12 through which TCP/UDP/IP encapsulated protocol frames or data packets can be routed over a standard USB connection included in the wired interface 16. The standard USB connection can be supported by the wired interface 16, since it can provide Internet access to the applications 14 on the MCD 12 over a standard USB cable 51 connected to a USB connector included in the MCD 12. The wired interface 16 does not replace the existing technology specific interfaces such as the WLAN interface 22 or the CDMA/GSM interface 20 on the MCD 12. Instead, it compliments the other existing interfaces. The MCD 12 can let the applications 14 use any of the available wireless interfaces 18, 20, 22, as well as the wired interface 16, based on settings and policies maintained by the multi-technology selector 26.

The MCD 12 also provides CDMA and WLAN data plane bridges 36, 44 between the existing interfaces, such as the WLAN and CDMA interfaces 20, 22, or new and evolving interfaces such as the LTE interface 18 (LTE data plane bridge 32) and the wired interface 16.

Figure 7:
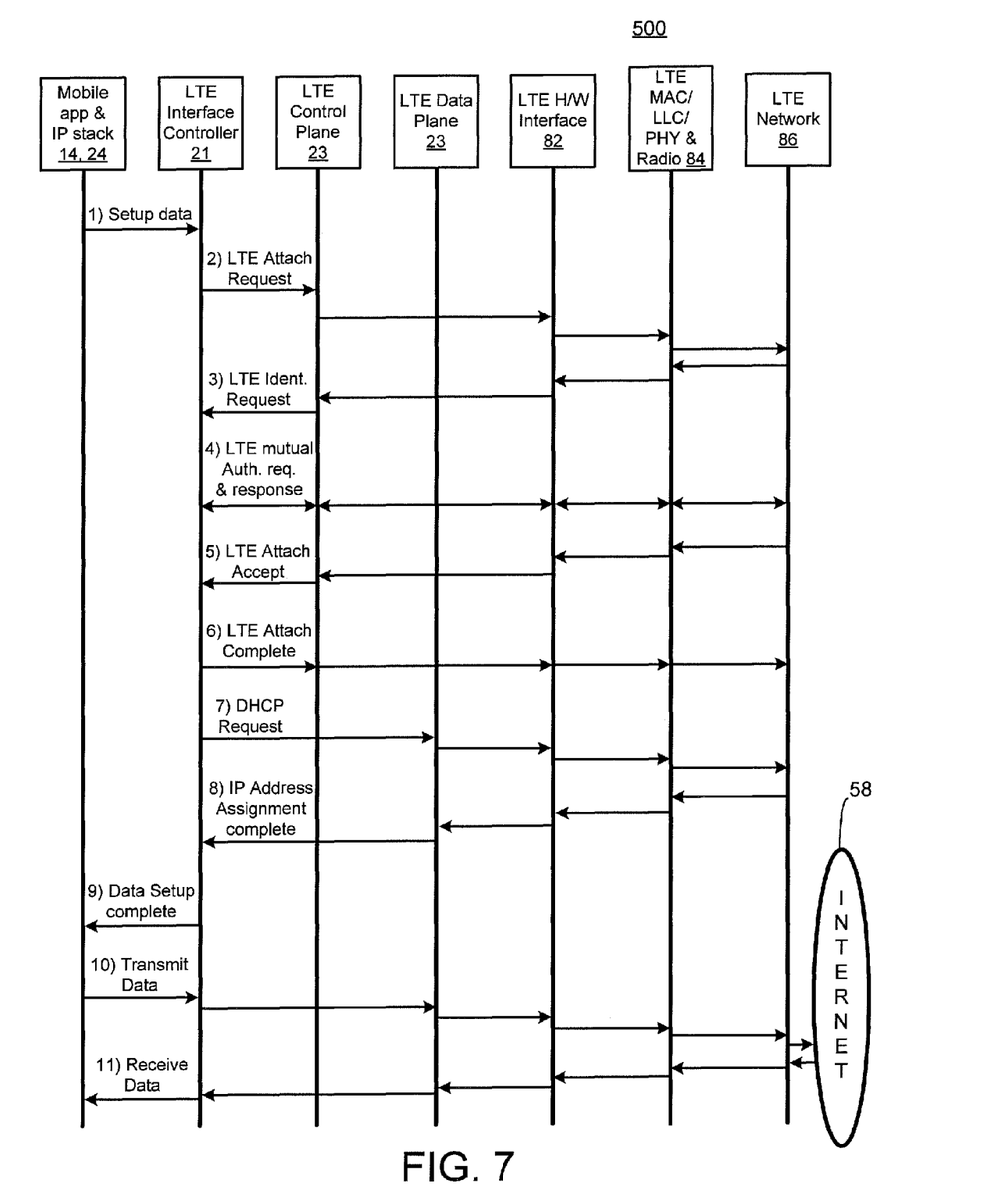
FIG. 7 is an exemplary message sequence diagram for an MCD having fully implemented LTE interface data and control planes, such as the MCD shown in FIG. 2.
Figure 8:
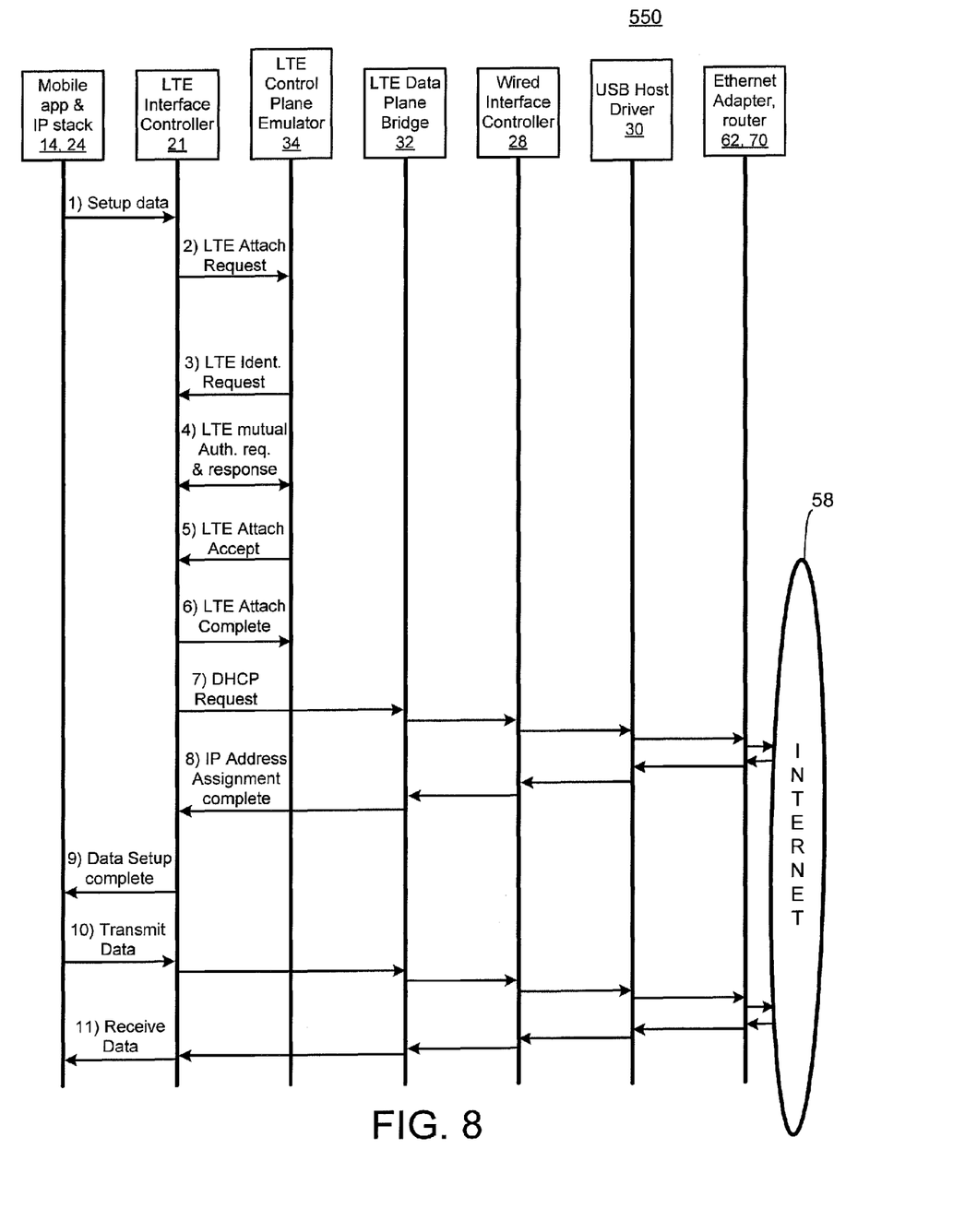
FIG. 8 is an exemplary message sequence diagram for an MCD having and LTE data plane bridge with a wired interface and LTE control-plane emulation, such as the MCDs shown in FIGS. 1 and 2.
Figure 9:
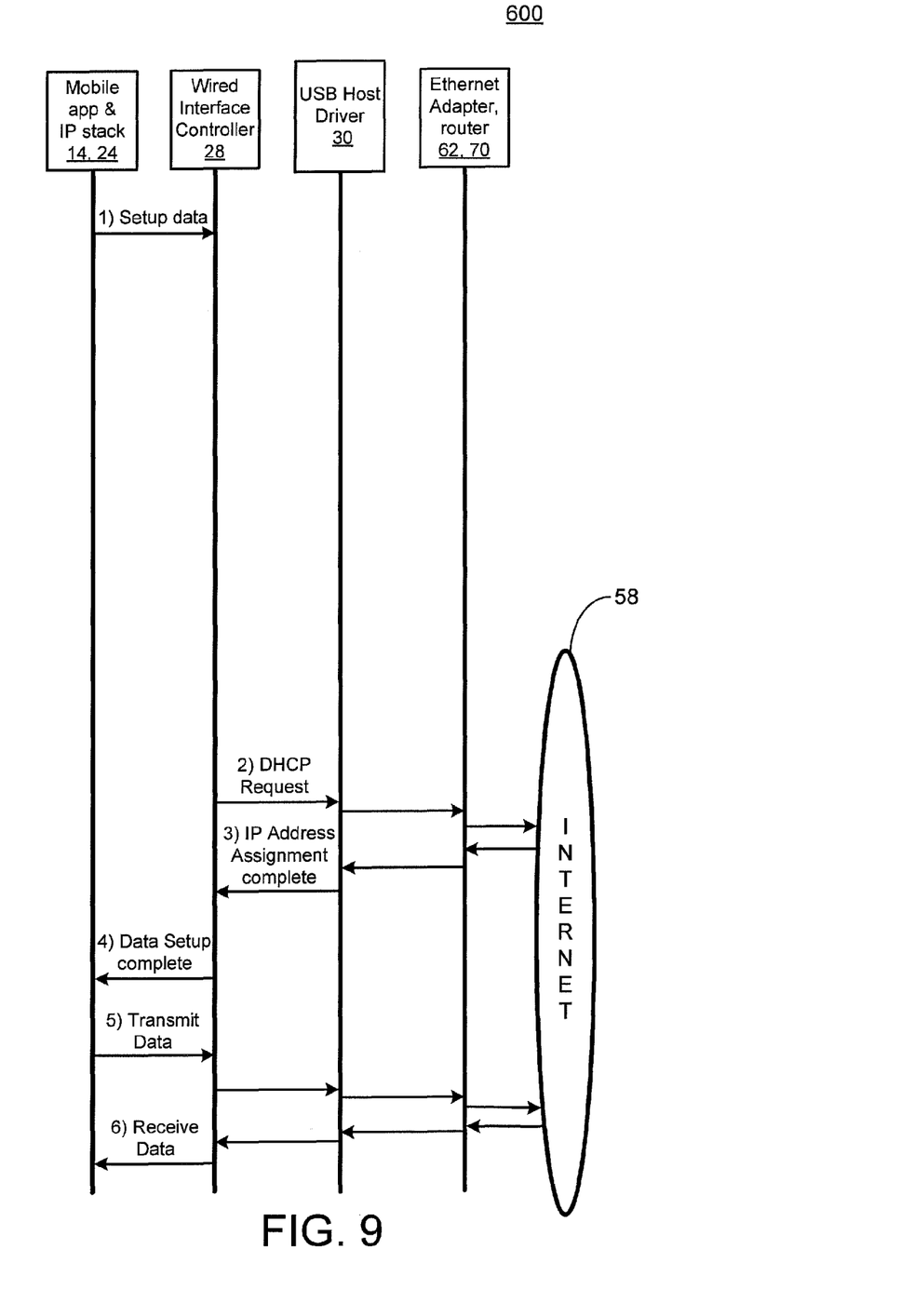
FIG. 9 is an exemplary message sequence diagram for an MCD having a wired interface, such as the MCDs shown in FIGS. 1 and 2.

Typical for many communication equipment designs is the use of separate data and control planes within the system. The data plane, sometimes referred to as the fast path, is used to transport the data payload through the device from ingress, through processing elements and eventually to uplinks for transport out of the system. As illustrated in FIGS. 7, 8 and 9, the data-plane may also be responsible for setting up the data path. The data planes in high-end systems often use proprietary or highly tuned architectures. However, some system use off-the-shelf network processors and switch fabrics. The control plane, or slow path, is typically implemented as a bus architecture. The control plane is used to provide system set-up and maintenance, and to handle exceptions in the data path where more processing is required which would tend to stall the fast path.

Each of the data plane bridges 32, 36, 44 can be implemented in software and translates data packets between the respective wireless network protocol and the wired interface for transport over the wired network.

Thus, the combination of the data plane bridges 32, 36, 44 and wired interface 16 on the MCD 12 can provide seamless network connectivity to the mobile applications 14. The applications 14 can use the existing wireless interfaces on the mobile platform, if available and functional. Otherwise, the bridging functionality of the wireless interfaces 18, 20, 22 can be used to send and receive data packets over the wired interface 16, in lieu of the actual hardware/chipset for the wireless technologies. This can be an important tool in quickly integrating newer wireless technologies (i.e., wireless network protocols) on a mobile device. The bridging functionality does not preclude the applications 14 from using the existing wireless interfaces 18, 20, 22 on the MCD 12. It simply provides a means for the applications 14 to use the same wireless interfaces, even if the wireless functionality is unavailable or not yet completely integrated in hardware and/or software on the MCD 12. The applications 14 can also directly access the wired interface 16 as well, in which case the bridging functionality of the wireless interfaces 18, 20, 22 is not needed.

Because the MCD 12 supports more than one wireless technology and includes the wired interface 16 and data plane bridges 32, 36, 44, application developers can test their mobile applications to ensure that they run seamlessly not only on the existing wireless technologies (e.g., CDMA and WLAN) that are already integrated and tested with the MCD 12, but also newer and emerging technologies (e.g., LTE) that have not been completely integrated and/or tested on the MCD 12.

The wired interface 16 of the MCD 12 can include a wired interface controller 28 and a USB host driver 30. The MCD 12 serves as the USB host and the USB would get enumerated on the adapter as a standard network interface card (NIC) interface. For that reason, the MCD 12 supports the USB host driver that is associated with the adapter 70, or supports the standard USB CDC-ECM Class drivers. The Ethernet connector on the dongle is hooked into the Ethernet router/switch 62 that is connected to the Internet 58 using a standard Ethernet cable. The adapter 70 takes care of the packet relay between USB and Ethernet.

In the MCD 12, the LTE interface 18 includes an LTE interface controller 21, the LTE data plane bridge 32, and an LTE control plane emulator 34 having one or more LTE control plane emulation modules. With the LTE hardware integration not available, it is still possible to have the control plane modules, such as LTE call processing manager, LTE security services, LTE mode controller or the like, integrated into the LTE control plane emulator 34. At the lowest level of the control plane, the control plane emulator 34 provides a technology specific control plane emulation/adaptation layer. This layer simulates the responses/asynchronous events that would originate from the actual hardware supporting the particular wireless technology, in this example, LTE.

In the MCD 12, however, for the LTE interface 18 without actual hardware integration available, it is typically difficult to emulate the data plane functionality that would be expected by the mobile applications 14. Thus, the wired interface 16 and the data plane bridge 32, fill that hardware gap by providing Internet connectivity over the wired interface 16, by way of the data plane bridge 32. As and when hardware integration is available, as seen in the MCD 13 of FIG. 2, an LTE control plane 23 could be made to communicate directly with the wireless technology hardware instead of the control plane emulator 34. Similarly, the data plane 32 could transition to using the actual LTE wireless hardware, instead of the wired interface 16 through the LTE data bridge 32. This would be a soft transition for the mobile application developers who could continue using the wired interface 16 during the change of the control and data plane to the actual hardware.

This not only speeds the system level porting of a new wireless technology, such as LTE, onto the MCD 12 for the mobile/handset OEM manufacturer, but it also enables mobile application developers and third-party developers to proceed with writing and testing applications that use the new wireless data services on the actual MCD 12, without waiting for the hardware and software integration of the new wireless technology to be completed on the MCD 12.

The CDMA/GSM interface 20 includes a CDMA/GSM interface controller 37, a CDMA/GSM data plane bridge 36, a CDMA/GSM control plane emulator 38, CDMA/GSM control and data planes 39, and a CDMA/GSM hardware (H/W) interface 40. The CDMA/GSM H/W interface 40 may include the media access control (MAC), link layer control (LLC), and physical layers of the CDMA/GSM network protocol, as well as the radio 42 for the CDMA/GSM wireless link.

The WLAN interface 22 includes a WLAN interface controller 45, a WLAN data plane bridge 44, a WLAN control plane emulator 46, WLAN control and data planes 47, and a WLAN hardware (H/W) interface 48. The WLAN H/W interface 48 may include the media access control (MAC), link layer control (LLC), and physical layers of the WLAN network protocol, as well as the radio 50 and other electronic hardware for communicating over the WLAN link.

In a typical operation, when the MCD 12 powers up or when requested by a mobile application 14, a DHCP request for IP address assignment is sent over one of the available technology interfaces on the MCD 12 as part of the data-plane setup.

If the multi-technology interface selector 26 selects a wireless technology specific interface such as LTE, the LTE interface controller 21 ensures that it sets up the control-plane by sending the LTE Attach Request, to be able to eventually send a DHCP request to the LTE network for data-plane setup, and get an IP address assigned for use by the mobile application 14. This procedure using the LTE network, as an example, is shown in FIG. 7.

Even without complete hardware integration of the LTE technology into the MCD 12, it is still possible to have the LTE interface controller 21 use the wired interface 16 through LTE data plane bridging 32. In this case, the LTE interface 18 would use the wired interface 16 for IP address assignment and packet exchange with the Internet 58. The LTE control-plane emulator 34 allows the LTE interface controller 21 to work seamlessly with the wired interface data-plane bridging. An example of this procedure is shown in FIG. 8.

Based on policy or availability, the multi-technology interface selector 26 could also directly choose the wired interface 16 over existing technology specific interfaces (like LTE). In that case, the wired interface controller 28 transmits a DHCP request to the adapter 70 through the USB host driver 30. The adapter 70 then relays the DHCP request to the router 62 over the NIC interface. On getting a DHCP IP address assignment from the router 62, the adapter 70 relays it back to the MCD over the wired interface 16. The wired interface 16 then assigns itself the IP address assigned in this fashion and makes it available to the TCP/IP stack 24 on the MCD 12 for any applications 14 that need to access the Internet 58. An example of this procedure is shown in FIG. 9.

Figure 2:
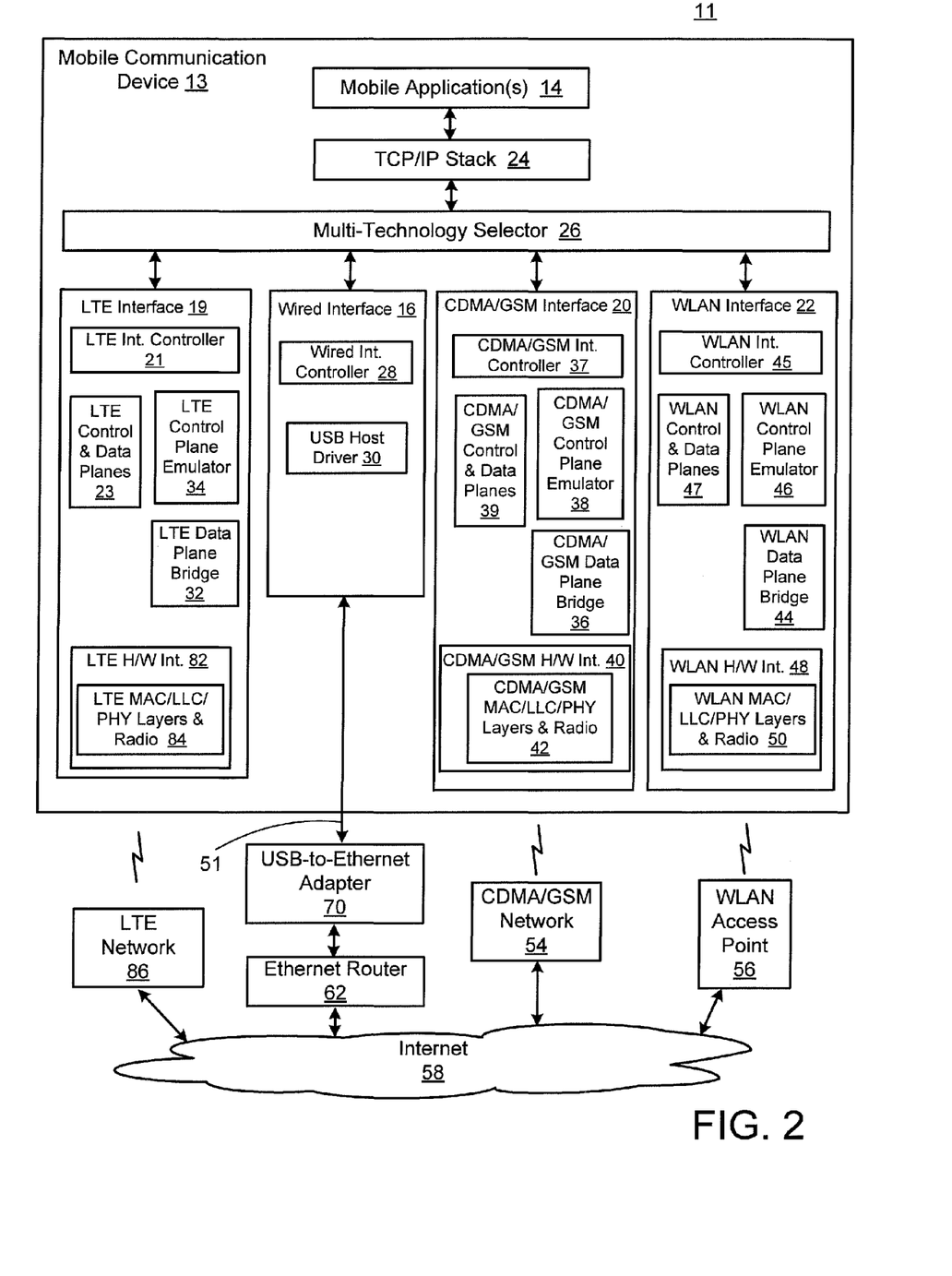
FIG. 2 illustrates second exemplary wireless communication system including an MCD capable of emulating a wireless network protocol.

FIG. 2 illustrates second exemplary wireless communication system 11 including an MCD 13. The predominant difference between the first system 10 and second system 11 is that the second system 11 includes an MCD 13 having a fully implemented LTE network interface 19 for wireless communicating with an LTE network 86. The LTE interface 19 includes an LTE hardware (H/W) interface having the media access control (MAC), link layer control (LLC), and physical layers of the LTE network protocol, as well as the radio 42 for the LTE wireless link.

With either of the above-described system architectures 10, 11, the wired interface 16 can provide an anchor point for the IP, DHCP, ARP protocol stacks on the MCD through which the system modules or applications 14 on the MCD 12 can communicate with the Internet 58. In addition, the data plane bridging functionality extends this solution to new and existing wireless technologies on the MCDs 12, 13.

Figure 3:
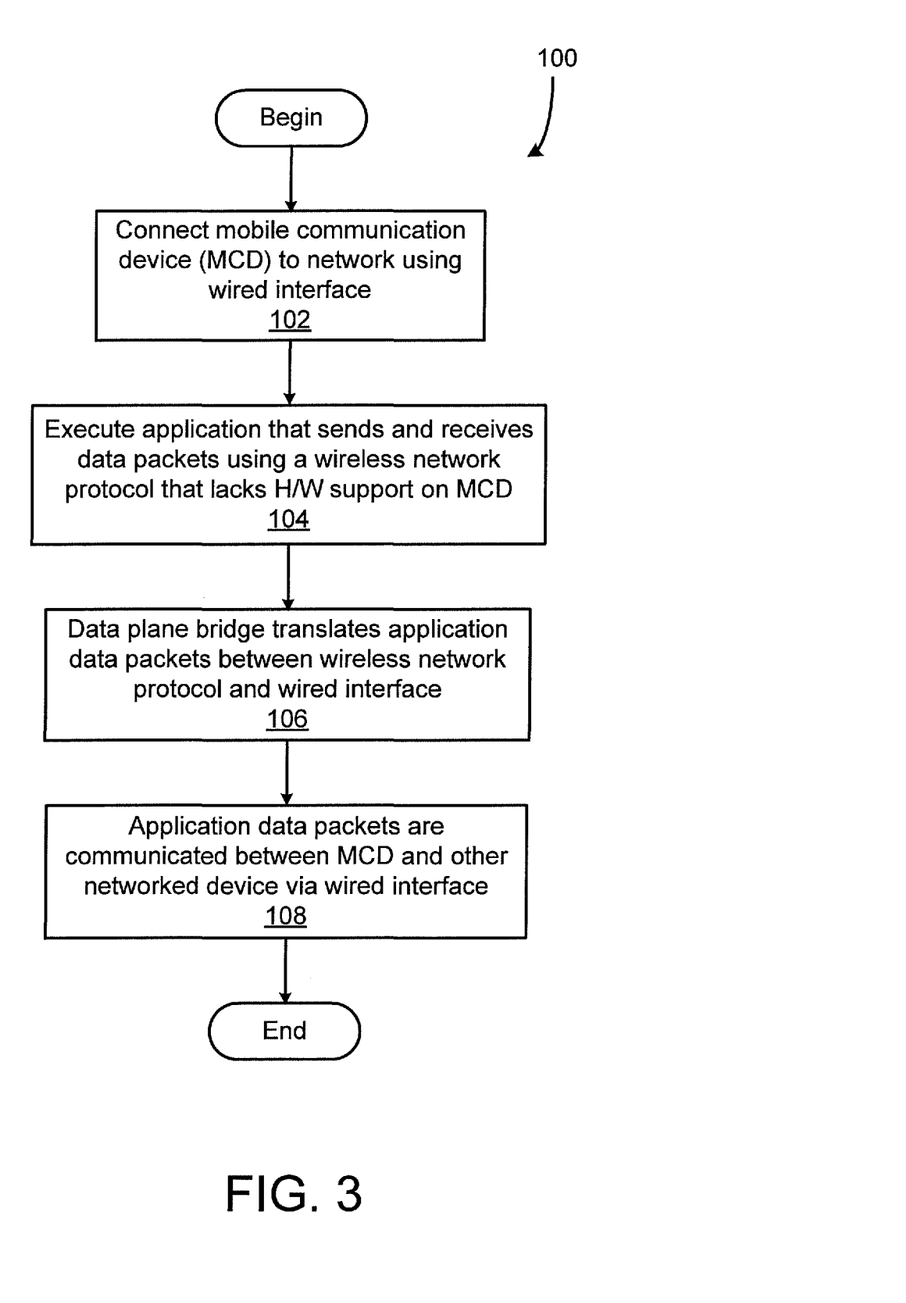
FIG. 3 is a flowchart illustrating a method of communication over a wired interface for an MCD that lacks hardware for a certain wireless network protocol.

FIG. 3 is a flowchart 100 illustrating an exemplary method of communication over a wired interface for an MCD that lacks hardware for a particular wireless network protocol. In block 102, an MCD, such the MCDs 12, 13 disclosed herein, is connected to a network over a wired interface, such as the wired interface 16. This permits communications between the connected MCD and a separate, networked device through a network, such as the Internet 58.

In block 104, an application, e.g., one of the mobile applications 14, on the MCD is started and executed. The application sends and/or receives data packets using a wireless network protocol, e.g., LTE, that lacks full hardware and/or software support on the MCD (see for example, FIG. 1). To successfully send and receive data packets to and from the application, the MCD executes the data plane bridge corresponding to the partially supported or unsupported wireless network protocol. The data plane bridge then translates data packets between the wireless network protocol and the wired interface (block 106). The MCD can then communicate the data packets between the application and the wired interface at the MCD. The translated data packets are sent between the MCD and one or more other networked devices by way of the wired interface (block 108). The wired interface is used instead of the wireless network corresponding to the wireless protocol used by the application.

Figure 4:
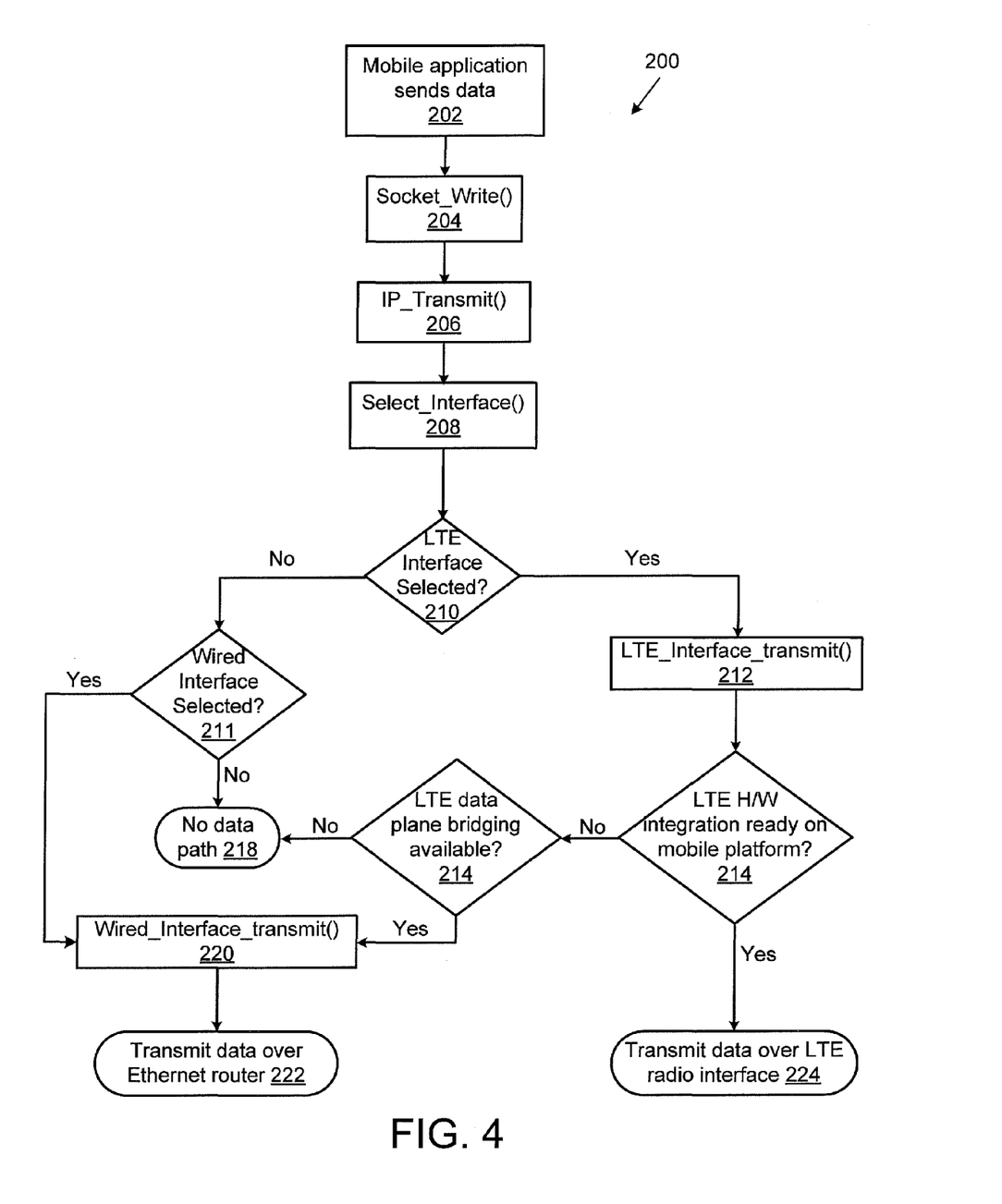
FIG. 4 is a flowchart illustrating an exemplary method of transmitting data from an MCD having LTE and wired interfaces, such as the MCDs shown in FIGS. 1 and 2.

FIG. 4 is a flowchart illustrating an exemplary method 200 of transmitting data from an MCD having LTE and wired interfaces, such as the MCDs 12, 13 shown in FIGS. 1 and 2. The method 200 illustrates the data bridging functionality. In step 202, the mobile application 14 sends a data transmit request through the TCP/IP stack 24, which includes a socket_write( ) call (step 204), an IP_transmit( ) call (step 206) and a select_interface( ) call (step 208). The select_interface( ) call indicates which of the interfaces 18, 16, 20, 22 that the application 14 intends to use. In the example method 200, the two interfaces to select from are the wired interface 16 and the LTE interface 18.

In decision step 210, the multi-technology selector 26 determines whether the LTE interface 18 is selected. If the LTE interface 18 is not selected, the multi-technology selector 26 determines whether the wired interface 16 is selected by the application 14 for direct transmission over the wired network (step 211). If not, no valid data path has been selected by the application 14, and the data transmission does not occur (step 218). If so, the data transmission takes place through the wired interface 16 according to steps 220 and 222, as described below.

Returning to step 210, if the application 14 selects the LTE interface 18, the multi-technology selector 26 generates an LTE_Interface_transmit( ) call (step 212) to the LTE interface controller 21. The LTE interface controller 21 determines whether the LTE modem hardware is fully integrated into MCD 12 (step 214). If so, data from the application 14 is transmitted over the LTE hardware interface 82 (step 224). If not, the LTE interface controller 21 determines whether the LTE data plane bridge 32 is available (step 216). If the data plane bridge 32 is not available, no data path is selected and the data transmission does not occur (step 218). However, if the data plane bridge 32 is available, the LTE data plane bridge 32 is executed to translate, e.g., format and encapsulate, the data for transport over the wired interface 16. This is accomplished by a wired_interface_transmit( ) call (step 220). In step 222, the data from the application 14 is transmitted over the wired network, through the adapter 70 and router 62.

Figure 5:
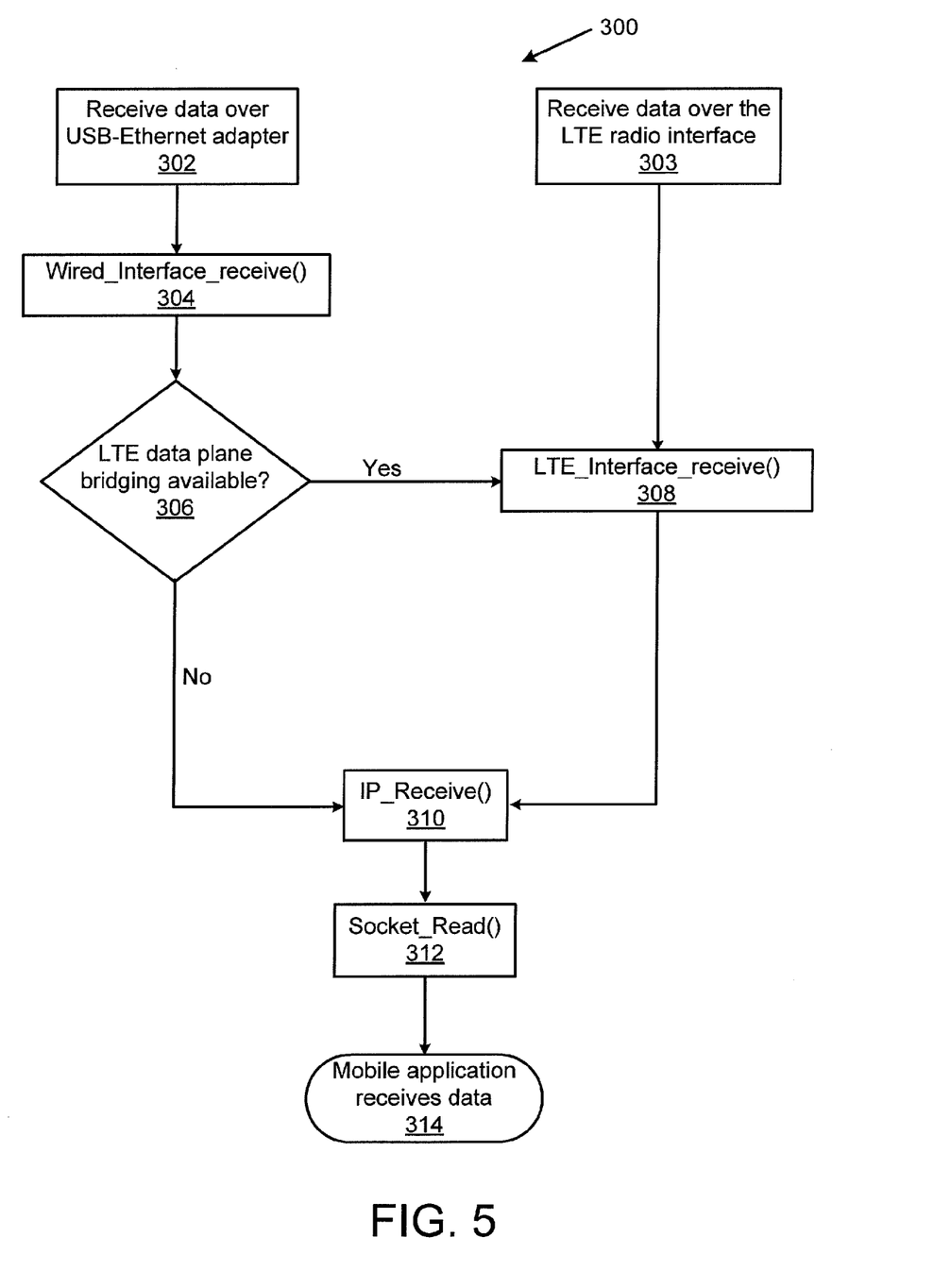
FIG. 5 is a flowchart illustrating an exemplary method of receiving data at an MCD having LTE and wired interfaces, such as the MCDs shown in FIGS. 1 and 2.

FIG. 5 is a flowchart illustrating an exemplary method 300 of receiving data at an MCD having LTE and wired interfaces, such as the MCDs 12, 13 shown in FIGS. 1 and 2. The method 300 illustrates an example of the data bridging functionality during a data receive operation at one of the MCDs 12, 13.

In step 302, the wired interface 16 determines that packetized data are received at the wired interface 16. A wired_interface_receive( ) call is generated by the wired interface controller 28 (step 304). Next, in step 306, the wired interface controller 28 determines whether the LTE data plane bridge 32 is available and required by the receiving mobile application. If not, an IP_receive( ) call is generated (step 310), and a socket_read( ) call (step 312) by the mobile application 14 permits the application 14 to receive the data (step 314).

Returning to decision step 306, if the wired interface controller 28 determines that the LTE data plane bridge 32 is available and required by the application 14, the LTE data plane bridge 32 is invoked to translate the incoming data packets from the wired network protocol to the LTE network protocol, and a LTE_interface_receive( ) call is generated (step 308). An IP_receive( ) call is then generated (step 310), and a socket_read( ) call (step 312) by the mobile application 14 permits the application 14 to receive the data (step 314).

If the MCD 13 should receive data directly over the fully implemented LTE wireless interface 19 (step 303), the method of receiving the data by the application 14 proceeds according to steps 308-314, described above.

Figure 6:
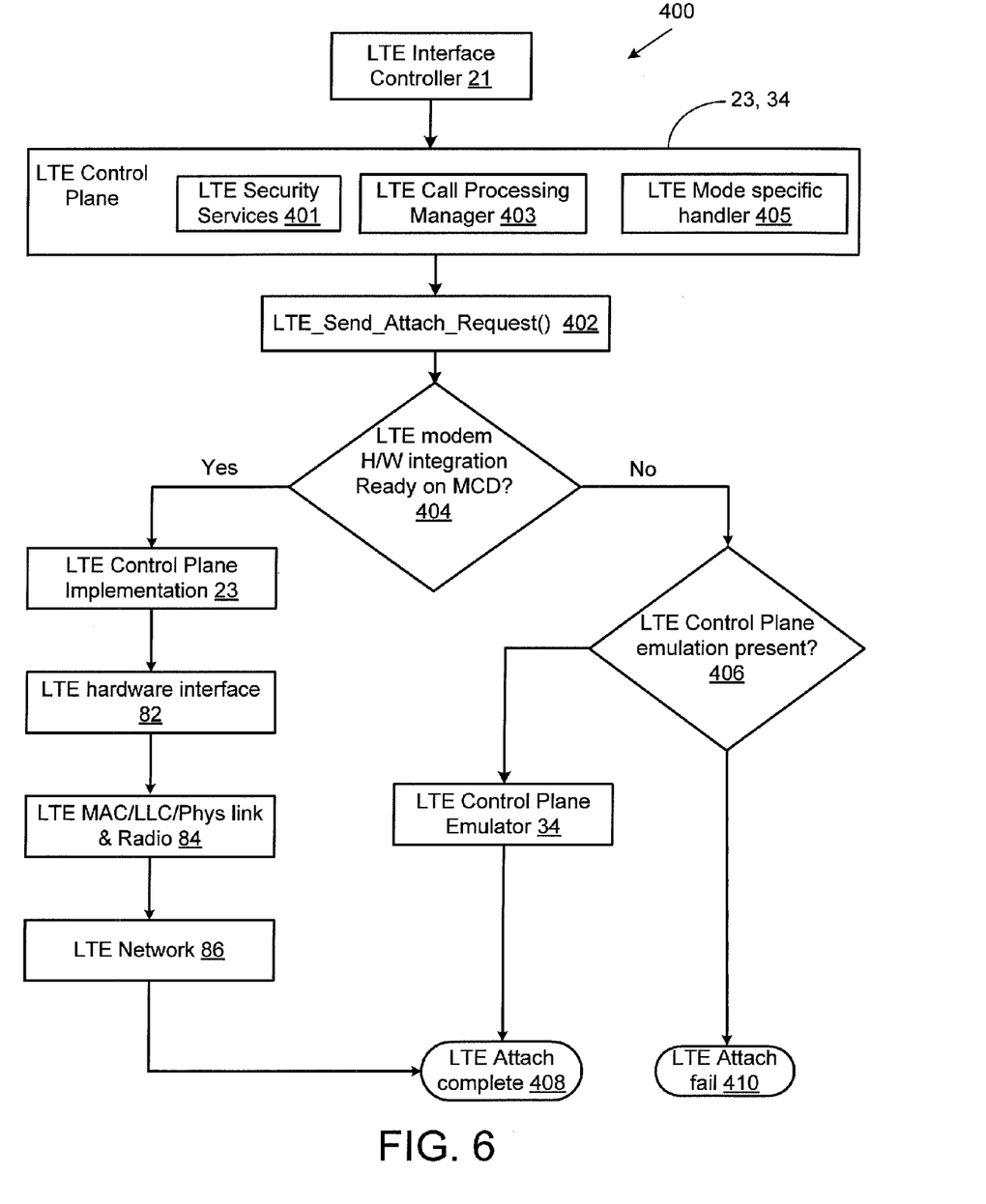
FIG. 6 is a process diagram illustrating an exemplary LTE control path within an MCD having LTE and wired interfaces, such as the MCDs shown in FIGS. 1 and 2.

FIG. 6 is a process diagram 400 illustrating an exemplary LTE control path within an MCD having LTE and wired interfaces, such as the MCDs 12, 13 shown in FIGS. 1 and 2. The process diagram 400 specifically depicts the process of performing an LTE Attach operation by one of the MCDs 12, 13.

In response to receiving setup data from the mobile application 14, the LTE interface controller 21 calls the LTE control plane 23, 34, which generates an LTE_send_attach_request( ) call (step 402).

The LTE control plane 23, 34 may include certain software/firmware modules for performing LTE control plane functions, such as an LTE security services module 401, an LTE call processing manager 403, an LTE mode specific handler 405 or the like.

In decision step 404, the LTE interface controller 21 determines whether the LTE modem hardware (H/W) is fully integrated on the MCD 12, 13. If so, the LTE_send_attach_request( ) is transmitted to the LTE network 86 through the LTE control plane 23, the LTE hardware interface 82 and the LTE interface lower layers 84 to the LTE network 86, resulting in a completed LTE attach operation (step 408). If not, the LTE interface controller 21 determines whether LTE control plane emulation is present (step 406). If so, the LTE control plane emulator 34 emulates the synchronous and asynchronous responses from the LTE network 86 to virtually perform the LTE Attach operation internally on the MCD 12, 13, without actually contacting the LTE network 86, so that the LTE Attach operation is completed (step 408). Returning to step 406, if LTE control plane emulation is not available on the MCD, then the LTE Attach operation fails (step 410).

FIG. 7 is an exemplary message sequence diagram 500 for an MCD having fully implemented LTE interface data and control planes 23, such as the MCD 13 shown in FIG. 2. The sequence diagram 500 illustrates the various messages that may be passed between various components of the MCD 13 and the system 11 during an LTE Attach operation and subsequent data transfers over the LTE network 86.

Initially, setup data is sent from the mobile application 14 to the LTE interface controller 21 (step 1). In turn, the LTE interface controller 21 outputs an LTE Attach Request to the LTE control plane 23 (step 2). Next, the LTE control plane 23 processes the request to send the LTE Attach Request from controller 21 and outputs an LTE_attach_request to the LTE hardware interface 82, which then sends the request to the LTE lower layers 84 for wireless transmission to the LTE network 86.

In response to the Attach Request, the LTE network returns an LTE identity request (step 3), an LTE mutual authorization request and response (step 4), and an LTE attach accept (step 5), all to the LTE interface controller 21. Step 4 is typically a back-and-forth interaction between the LTE interface controller 21 and LTE network 86. In response to these messages, the LTE interface controller 21 returns an LTE Attach Complete message to the LTE network 86 (step 6).

After the attachment is accepted, the controller 21 then sends a DHCP request to the Internet 58 through the LTE network 86 (step 7). As per the LTE standard, the IP address assignment can happen automatically (during the default bearer setup) after the Attach complete, or the assignment can be explicitly requested by the mobile communication device, i.e. by the MCD 13 through a DHCP request. The second option is represented in FIG. 7, as it gives the MCD better control over when to request IP address assignment, and that works seamlessly with the wired-interface through LTE data-bridging (e.g., as depicted in FIG. 8). The LTE network 86 responses with an IP address assignment complete message (step 8). The LTE interface controller 21 then notifies the mobile application 14 that the LTE data setup is completed (step 9).

In response, the mobile application 14 can then transmit (step 10) or receive (step 11) data through the LTE network 86 and Internet 58.

FIG. 8 is an exemplary message sequence diagram 550 for an MCD having and LTE data plane bridge 32 with a wired interface 16 and LTE control-plane emulation 34, such as the MCDs 12, 13 shown in FIGS. 1 and 2. The sequence diagram 550 illustrates the various messages that may be passed between various components of the MCD 12, 13 and the system 10, 11, respectively, during an emulated LTE Attach operation and subsequent data transfers over the wired network using the LTE data plane bridge 32.

Initially, setup data is sent from the mobile application 14 to the LTE interface controller 21 (step 1). In turn, the LTE interface controller 21 outputs an LTE Attach Request to the LTE control plane emulator 34 (step 2). In response to the Atttach Request, the LTE control plane emulator 34 returns an LTE identity request (step 3), an LTE mutual authorization request and response (step 4), and an LTE attach accept (step 5), all to the LTE interface controller 21. Step 4 is actually a back-and-forth interaction between controller 21 and LTE control plane emulator 34. Essentially, control plane emulator 34 emulates the LTE network synchronous and asynchronous responses to the LTE interface controller 21.

In response to these messages, the LTE interface controller 21 returns an LTE Attach Complete message to the LTE control plane emulator 34 (step 6).

After the attachment is accepted, the controller 21 then sends a DHCP request to the Internet 58 through the LTE data plane bridge 32 and wired interface 16 (step 7). As per the LTE standard, the IP address assignment (default bearer setup) can happen automatically after the Attach complete, or the assignment can be explicitly requested by the mobile communication device, i.e. by the MCD 12, 13 through a DHCP request. The second option is represented in FIG. 8, as it gives the MCD better control over when to request IP address assignment, and that works seamlessly with the wired-interface through LTE data-bridging. The router 70 responses with an IP address assignment complete message (step 8) by way of the wired interface 16. The LTE interface controller 21 then notifies the mobile application 14 that the LTE data setup is completed (step 9).

In response, the mobile application 14 can then transmit (step 10) or receive (step 11) data through the LTE interface 18 via the wired interface 16.

FIG. 9 is an exemplary message sequence diagram 600 for an MCD having a wired interface, such as the MCDs 12, 13 shown in FIGS. 1 and 2. The sequence diagram 600 illustrates the various messages that may be passed between various components of the MCD 12, 13 and the system 10, 11, respectively, during setup and subsequent data transfers over the wired interface 16.

Initially, setup data is sent from the mobile application 14 through the wired interface controller 28 (step 1). In turn, the wired interface controller 28 outputs a DHCP request to the USB host driver 30, which sends the request through the adapter 70 and router 62 to the Internet 58 (step 2). An IP address is assigned and transferred to the wired interface controller 28, completing the setup process (steps 3-4). The mobile application 14 can then transmit (step 5) or receive (step 6) data through the wired interface 16.

Although the foregoing description focuses on the data plane bridging function and control plane emulation of the LTE interface, the CDMA and WLAN interfaces 20, 22 can each be configured in like manner as disclosed herein to use their respective data plane bridging and control plane emulation to transfer data through the wired interface 16.

The functionality of the systems, devices, and their respective components, as well as the method steps and blocks described herein may be implemented in hardware, software, firmware, or any suitable combination thereof. The software/firmware may be a program having sets of instructions (e.g., code segments) executable by one or more digital circuits, such as microprocessors, DSPs, embedded controllers, or intellectual property (IP) cores. If implemented in software/firmware, the functions may be stored on or transmitted over as instructions or code on one or more computer-readable media. Computer-readable medium includes both computer storage medium and communication medium, including any medium that facilitates transfer of a computer program from one place to another. A storage medium may be any available medium that can be accessed by a computer. By way of example, and not limitation, such computer-readable medium can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable medium.

Other embodiments and modifications of the methods, systems and apparatuses described above will occur readily to those of ordinary skill in the art in view of these teachings. Thus, the foregoing description is illustrative and not restrictive. The invention is to be limited only by the following claims, which cover all such other embodiments and modifications, when viewed in conjunction with the above specification and accompanying drawings. The scope of the invention should, therefore, not be limited to the above description, but instead should be determined with reference to the appended claims along with their full scope of equivalents.

What is claimed is:

1. A mobile communication device, comprising:
   a wired interface configured to communicate with a separate device via a wired connection using a wired network protocol; and
   a data plane bridge, responsive to the wired interface, configured to translate data packets between the wired network protocol of the wired interface and a wireless network protocol used by an application to transfer the data packets, the application being executable by the mobile communication device, where the wireless network protocol lacks at least one of hardware support and software support on the mobile communication device.

2. The mobile communication device of claim 1, wherein the wired interface include a USB.

3. The mobile communication device of claim 1, wherein the separate device is a USB-to-Ethernet adapter dongle.

4. The mobile communication device of claim 1, further comprising one or more control plane modules implementing the wireless network protocol.

5. The mobile communication device of claim 4, further comprising a control plane emulation layer for emulating responses and asynchronous events generated by hardware configured to implement the control plane of the wireless network protocol.

6. The mobile communication device of claim 1, wherein the wireless network protocol is LTE.

7. The mobile communication device of claim 1, wherein the data plane bridge is configured to send data between a wireless network interface included in the mobile communication device and the wired interface.

8. The mobile communication device of claim 1, further comprising one or more wireless interfaces selected from the group consisting of a WLAN interface, a WWAN interface, and any suitable combination of the foregoing interfaces.

9. The mobile communication device of claim 8, further comprising a data plane bridge for each of the wireless interfaces included in the mobile communication device.

10. A system, comprising:
   a networked device having a USB interface and an Ethernet interface;
   a mobile communication device including:
      an application that transfers data packets using a wireless network protocol, where the wireless network protocol lacks at least one of hardware support and software support on the mobile communication device,
      a USB interface configured to communicate with the networked device via a wired USB connection, and
      a data plane bridge configured to translate the data packets between a USB protocol and the wireless network protocol.

11. The system of claim 10, further comprising an Ethernet router connected to the networked device and the Internet.

12. The system of claim 10, wherein the networked device is selected from the group consisting of a personal computer including a USB-to-Ethernet driver relay module and a USB-to-Ethernet adapter dongle.

13. The system of claim 10, wherein the mobile communication device further comprises one or more control plane modules implementing the wireless network protocol.

14. The system of claim 13, wherein the mobile communication device further comprises a control plane emulation layer emulating responses and asynchronous events generated by hardware configured to implement the control plane of the wireless network protocol.

15. The system of claim 10, wherein the wireless network protocol is LTE.

16. The system of claim 10, wherein the data plane bridge is configured to send data between a wireless network interface included in the mobile communication device and the USB interface.

17. A method of communication between a mobile communication device and a networked device, comprising:
   connecting the mobile communication device to the networked device via a wired interface that uses a wired network protocol;
   executing an application on the mobile communication device, wherein the application sends and receives data packets using a wireless network protocol, where the wireless network protocol lacks at least one of hardware support and software support on the mobile communication device;
   at the mobile communication device, translating the data packets between the wired network protocol and the wireless network protocol; and
   communicating the data packets between the mobile communication device and the networked device via the wired interface using the wired network protocol.

18. The method of claim 17, wherein the networked device is selected from the group consisting of a personal computer including a USB-to-Ethernet driver relay module and a USB-to-Ethernet adapter dongle.

19. The method of claim 17, further comprising:
   the mobile communication device emulating responses and asynchronous events generated by hardware configured to implement the wireless network protocol.

20. The method of claim 17, wherein the wired interface include a USB.

* * * * *